United States Patent [19]

Suzuki

[11] 4,429,974
[45] Feb. 7, 1984

[54] POWER SUPPLY DEVICE FOR CAMERA

[75] Inventor: Nobuyuki Suzuki, Kawasaki, Japan

[73] Assignee: Canon Kabushiki Kaisha, Tokyo, Japan

[21] Appl. No.: 391,718

[22] Filed: Jun. 24, 1982

[30] Foreign Application Priority Data

Jul. 7, 1981 [JP] Japan ............................... 56-106406

[51] Int. Cl.³ ...................... G03B 7/087; G03B 17/38
[52] U.S. Cl. ..................................... 354/484; 354/268
[58] Field of Search ..................... 354/60 R, 266, 267, 354/268

[56] References Cited

U.S. PATENT DOCUMENTS 4,387,977  6/1983  Uchidoi et al. ................... 354/60 R Primary Examiner—Michael L. Gellner
Attorney, Agent, or Firm—Toren, McGeady and Stanger

[57] ABSTRACT

In a camera of the type arranged to supply power to the circuits thereof by the first stroke of a release member and to perform a shutter release by the second stroke of the member, a timer circuit which is responsive to the first stroke causes a power supply device to continuously supply power for a predetermined period of time after the first stroke. A camera of this type is convenient because, once the first stroke is made, the timer circuit causes the power supply to be effected over a given length of time, so that the process of composing a picture and the like can be performed without continuously depressing the release member. However, even a momentary unintended contact of a finger with the release member, accidentally resulting in the first stroke thereof, renders the timer circuit operative causing wasteful power consumption. This problem is solved by a power supply device according to the present invention, which operates the timer circuit only when the first stroke operation on the release member persists for a prescribed period of time.

7 Claims, 2 Drawing Figures

POWER SUPPLY DEVICE FOR CAMERA

BACKGROUND OF THE INVENTION

1. Field of the Invention

This invention relates to a power supply holding device for a photographic camera and more particularly to a the power to the holding device which enables power supply to light measuring, computing and display circuits, etc. to be supplied over a prescribed period of time only when necessary.

2. Description of the Prior Art

The conventional power supply control devices for cameras include the type arranged to supply power to the various circuits such as light measuring, computing and display circuits by having a first switch operated by the first operating stroke of a release button and to actuate the camera by having a second switch operated by the second operating stroke of the release button. A typical example of the conventional power supply control devices of this type is a power supply holding device disclosed in a Japanese patent application No. SHO 53-130828 (Japanese Patent Appl. Laid-Open Publication No. SHO 55-57830). This prior art device includes an electronic timer circuit which holds the above stated light measuring, computing and display circuits, etc. in an energized state over a prescribed period and a third switch which renders the electronic timer circuit operative. The arrangement of the prior art is such that, when the third switch is operated, the electronic timer circuit is actuated in response to the operation of the first switch to permit light measuring, computing and display actions for a prescribed period of time. In this case, however, after the third switch is set into an operative state, there is a probability that the operator might forget to bring the switch back to its original position. Under such a condition, accidental or unintended contact of a finger with a shutter release button, even just momentarily, would cause the electronic timer to operate, resulting in wasteful power consumption. It is also possible that, while the camera is in a travelling bag, travelling vibrations might bring another article contained in the same bag into momentary contact with the shutter release button to cause wasteful power consumption through an accidental operation of the electronic timer. This is the first problem with the prior art arrangement.

In the prior art arrangement, the operation of the electronic timer is arranged to begin at the point of time when the shutter release button is released from the first stroke of a depressing operation thereon. Therefore, in cases where the timer is not required, if the first stroke operation is performed and the third switch is not brought back back to its original position and if, thereafter the shutter button is released from the first stroke operation, the timer, which is not actually necessary at all, is operated for the whole length of the prescribed time, wasting power. This is a second problem with the prior art arrangement.

Further, in the case of the above stated prior art arrangement, once the timer circuit is operated by the first stroke operation, the operation of the timer circuit persists until the end of the timer, operating time even when a second stroke operation on the shutter release button is performed during the operation of the timer circuit. Even after completion of an exposure which follows the second stroke operation, the operation of the timer circuit still continues, thereby wasting power as long as the timer operating time does not comes to an end. This is the third problem with the prior art arrangement.

SUMMARY OF THE INVENTION

It is an object of the present invention to provide a power supply holding device for a camera which solves the first problem mentioned in the foregoing by holding the above stated timer circuit inoperative when a first operating stroke of the shutter release button is caused to momentarily take place by an unintended or accidental operation thereof and by allowing the timer circuit to operate only when the first stroke operation lasts longer than a prescribed period of time thereby preventing wasteful power consumption.

It is another object of the invention to provide a power supply holding device for a camera which solves the second problem mentioned in the foregoing by constructing the above stated timer circuit so that its operation begins the instant a first stroke operation of the shutter release button begins.

It is a further object of the invention to provide a power supply holding device for a camera which solves the third problem mentioned in the foregoing by arranging the above stated timer circuit to be rendered inoperative by a second stroke operation of the shutter release button after the timer circuit is rendered operative by a first stroke operation of the shutter release button.

These and further objects, features and advantages of the invention will become apparent from the following detailed description of a preferred embodiment thereof taken in connection with the accompanying drawings.

DETAILED DESCRIPTION OF PREFERRED EMBODIMENT

Figure 1:
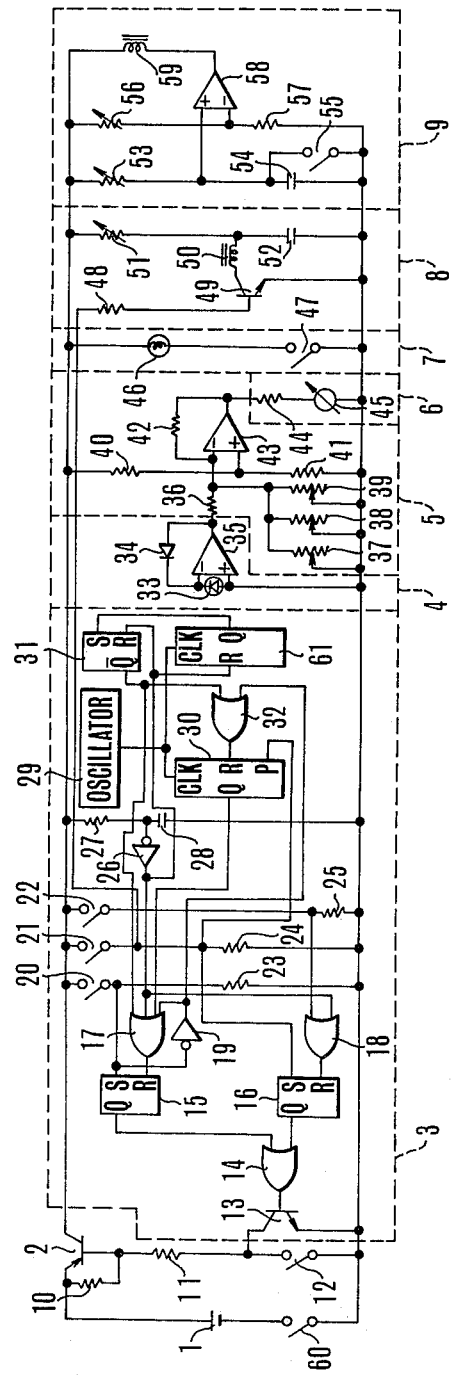
FIG. 1 is a circuit diagram showing an exposure control circuit of a camera having a power supply control circuit as an embodiment of the present invention.

Referring to FIG. 1 which shows an exposure control circuit of a camera as a preferred embodiment of the invention, the embodiment includes a power source battery 1 which is connected through a switching transistor 2 to a timer circuit 3, a light measuring circuit 4, an exposure computing circuit 5, a display circuit 6, an illumination circut 7, an electromagnetic release circuit 8 and a shutter control circuit 9. The transistor 2 has a resistor 10 connected between the emitter and the base thereof. The base of the transistor 2 is connected through a resistor 11 to a light measuring switch 12. This switch 12 is arranged to close in response to the first stroke operation of a release button, which is not shown, causing the transistor to turn on. The collector of a transistor 13, serving to give the output of the timer circuit 3, is connected through the resistor 11 to the base of the transistor 2. The timer circuit 3 is formed by the transistor 13, an OR gate 14, flip-flops 15 and 16, OR gates 17 and 18, an inverter 19, switches 20, 21 and 22, resistors 23, 24 and 25, an inverter 26, a resistor 27, a capacitor 28, an oscillator 29, a counter 30, a flip-flop 31, an OR gate 32 and a counter 61. The output of the OR gate 14 is arranged to be supplied to the base of the transistor 13 to control it by turning it on and off. With transistor 13 turned on, transistor 2 turns on. The two input terminals of the OR gate 14 respectively have the output terminals Q of the flip-flops 15 and 16 connected thereto. A switch 20 is provided for the purpose of setting the timer. A switch 21 is arranged to be closed by the second stroke of the release button. A switch 22 is arranged to open in association with the movement of a winding lever which is not shown (or in association with the movement of a trailing curtain of the shutter in the case of a single-lens reflex camera) and to close in association with an exposure terminating action (or in association with a travel ending action of the trailing curtain of the shutter). The inverter 26, the resistor 27 and the capacitor 28 jointly form a circuit known by the name of "an initial reset circuit." The output level of the inverter 26 becomes high for a short period of time after the switch 12 closes. The high level output of the inverter 26 performs an initial reset action on flip-flop 15 through OR gate 17, on flip-flop 16 through OR gate 18, on flip-flop 31 and also on the counter 61.

The counters 30 and 61 count pulses received, through their terminals CLK, from the oscillator 29. The counter 30 produces, from its terminal Q, a high level output when the count value reaches a prescribed value 25.6 seconds after the start of the count. The counter 61 produces also a high level output from its terminal Q when the count value reaches a prescribed value 0.1 seconds after the start of the count. The terminals R of counters 30 and 61 are reset terminals. In each of these counters, the level of terminal Q is low when that of terminal R is high. Terminal P of the counter 30 is a preset terminal. The level of terminal Q becomes high when terminal R is at a low level and terminal P is at a high level. The light measuring circuit 4 consists of an operational amplifier 35, which has a light sensitive element 33 connected between the input terminals thereof, and a logarithmic suppression diode 34 connected between the input and output terminals of the operational amplifier 35. The output of the operational amplifier 35 is the output of the light measuring circuit 4 and is supplied to the first input terminal of an operational amplifier 43 through a resistor 36. Further, operational amplifier 43 has a variable resistor 39 for setting shutter time, a variable resistor 38 for setting film sensitivity and another variable resistor 37 for setting maximum aperture correction information also connected to the first input terminal thereof. The second input terminal of the operational amplifier 43 is arranged to have a divided voltage, of resistors 40 and 41, applied thereto. The output of the operational amplifier 43 is supplied to a meter 45 of the display circuit 6 through resistor 44 causing a correct aperture value to indicated by the meter 45. The illumination circuit 7 consists of a lamp 46, which illuminates the indicating state of the pointer of meter 45, and an illumination switch 47, which turns lamp 46 on and off. A series circuit comprised of a resistor 51 and a capacitor 52 forms a part of an electromagnetic release circuit 8 which is in parallel with the illumination circuit 7. The connection point of resistor 51 and capacitor 52 is connected to the collector of transistor 49 through magnet 50. Magnet 50 is provided with a permanent magnet for release and is arranged so that it drives the internal mechanism of the camera. The base of transistor 49 is connected through resistor 48 to the connection point between switch 21 and resistor 24. Therefore, when switch 21 is on, transistor 49 turns on causing capacitor 52 to discharge through magnet 50. The shutter control circuit 9 includes a comparator 58.

This connection point between capacitor 54 and variable resistor 53, which sets shutter time and is arranged to operate in association with the above stated shutter time setting variable resistor 39, is connected to the first input terminal of comparator 58. The second input terminal of comparator 58 has resistors 56 and 57 connected thereto. Capacitor 54 is in parallel with count switch 55 switch 55 is arranged to open in association with the opening of the shutter. The output terminal of comparator 58 is connected to shutter controlling magnet 59. The shutter is arranged to close when magnet 59 becomes non-excited. Reference numeral 60 indicates a main switch.

Figure 2:
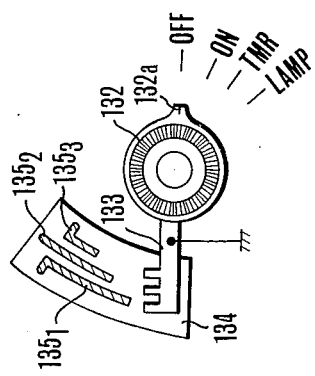
FIG. 2 is an illustration of a dial arrangement for operating switches shown in FIG. 1.

Referring now to FIG. 2, which shows a mechanism which opens and closes switches 20, 47 and 60, the mechanism includes an operation dial 132, which is disposed in a suitable position on the camera but is not shown. Dial 132 is provided with an index 132a, which is arranged to be set in one of positions; OFF, ON, TMR and LAMP. Brush 133, which is grounded, is attached to dial 132 as a travelling contact for switches 20, 47 and 60. Brush 133 is arranged to slide over a substrate 134, which is provided with electrodes $135_1$, $135_2$ and $135_3$, said electrodes serve as fixed contacts. These electrodes $135_1$, $135_2$ and $135_3$ are arranged to come into contact with brush 133 one after another as dial 132 is moved from the OFF position to positions ON, TMR and LAMP.

The arrangement described in the foregoing operates in the following manner. The first description covers a case where no timer operation is required:

When dial 132 is rotated to bring the index 132a into the position ON, the brush 133 comes into contact solely with the electrode $135_1$. Accordingly this closes only switch 60.

Further, the resistance of variable resistor 38 is set by a film sensitivity setting dial, which is not shown. The film sensitivity setting corresponds to the sensitivity of the film to be used. The resistance values of the shutter time rotating variable resistors 39 and 53 are set by setting the shutter time setting dial to a position corresponding to a desired shutter time value. The resistance value of variable resistor 37, for maximum aperture correction information, is set in accordance with the photograph taking lens to be mounted on the camera. Under this condition, the first stroke the depressing operation on the release button causes switch 12 to close. With switch 12 closed, transistor 2 turns on to supply power to timer circuit 3, light measuring circuit 4, computing circuit 5, display circuit 6, electromagnetic release circuit 8 and shutter control circuit 9. Then, brightness information, which is an output of the operational amplifier 35, corresponding to the output of the light sensitive element 33 and the various camera settings, as mentioned above, are continued at the operational amplifier 43 to obtain a correct aperture value. The correct value is then indicated at meter 45.

Because switch 20 is off at this point of time, the connection point of switch 20 and the resistor 23 is at a low level and the output of the inverter 19 is at a high level. Accordingly, the output of OR gate 32, i.e. the level of the terminal R of counter 30 connected thereto, is at a high level. Counter 30 is thus in a reset state and no counting action is performed. Since both terminals S of flip-flops 15 and 16 are at a low level, the level of the output of the OR gate 14 is low thereby keeping transistor 13 off. When switch 12 is turned off by lifting the users finger from the release button, the transistor 2 turns off immediately stopping the power supply to all circuits. When the release button is again depressed to the first stroke and then further depressed to make a second stroke, switches 12 and 21 are closed to excite the magnet 59 which magnet holds the shutter closing member. Concurrently transistor 49 turns on, causing the electric charge of capacitor 52 to discharge through magnet 50. Magnet 50 is thus excited. Then, at the magnet 50, which is provided with a permanent magnet, the magnetic flux produced by the permanent magnet is offset by the magnetic flux produced by the exciting coil of the release magnet thereby a release mechanism, which is not shown, is released from a locked state. With the release mechanism thus unlocked, the internal mechanism of the camera is actuated. As a result a shutter opening member acts to open the shutter and, at the same time, switch 55 opens. After the lapse of time determined by variable resistor 53 and capacitor 54, comparator 58 changes from a low to a high level bringing magnet 59 to a non-excited state. With magnet 59 brought into the non-excited state a shutter closing member acts to close the shutter.

Even if the user's finger is detached from the release button during shutter control, transistor 13 is turned on by OR gate 14 because flip-flop 16 has been brought into a set state by the second stroke of the release button depressing operation that is, the level of terminal Q of flip-flop 16 is at a high level. Therefore, transistor 2 is on supplying power to the circuits which are on. However, since the switch 22 is arranged to turn on in response to the shutter closing action, flip-flop 16 is reset through OR gate 18. Further, since flip-flop 15 also remains in a reset state because switch 20 is off, transistor 13 is turned off, by OR gate 14. With transistor 13 turned off, transistor 2 also turns off, bringing the power supply holding action to an end.

Next, the operation using the timer is described.

This is a case where the photographer wishes to confirm exposure information simultaneously with other operations, for example, while his left hand is used for a focusing operation and his right hand for operating a grip rod of a tripod for determining the composition of a picture.

In this case, when dial 132 is operated before hand to adjust the index 132a to the position TMR, brush 133 comes into contact with electrodes $135_1$ and $135_2$. This brings switches 60 and 20 into their closed states. The various kinds of photographic information are processed in the same manner as in the case of use without the timer. When the release is depressed, under this condition, the first stroke of the depressing operation closes switch 12 and the light measurement computation is carried out in the same manner as it is without the timer thereby displaying the correct aperture value on meter 45. Assuming that first stroke of the depressing operation lasts for a length of time not exceeding 0.1 sec, switch 12 turns off before terminal Q is at the high output level. The time counting action of counter 61, which is arranged to begin the counting action after initial resetting is effected by the output of the inverter 26 controls the output of terminal Q. Therefore, the power to counter 61 is stopped, stopping the time counting action thereof and, accordingly, flip-flop 31 is not set. In this instance the level of terminal $\overline{Q}$ is high. Accordingly, OR gate 17 puts terminal R of flip-flop 15 at a high level thereby keeping flip-flop 15 in a reset state. Further, since flip-flop 16 is then also in a reset state, transistor 13 is kept off. Therefore, in this case, when switch 12 is turned off, transistor 2 immediately turns off to cut off power. Therefore, when the duration of the first stroke of the shutter release button depressing operation does not exceed 0.1 sec switch 12 is turned on to supply power to circuits only for the duration of the first stroke and no power supply holding action takes place thereafter.

In cases where the shutter release button is depressed to the first stroke for a period of time exceeding 0.1 sec, the following operation takes place: When 0.1 sec has elapsed after commencement of a time counting action by the counter 61, terminal Q, of the counter 61, changes to a high level thereby setting flip-flop 31. The level of terminal $\overline{Q}$ of the flip-flop 31 becomes low. Since switch 20 is then in a closed state, the level of terminal S of flip-flop 15 is high and those of all the inputs of OR gate 17 are low (terminal Q of the counter 30 is at a low level). Therefore, flip-flop 15 is set to turn on transistor 13 through OR gate 14. In this case, therefore, even after the shutter release button is released from the first stroke operation thereby opening switch 12, transistor 2 is kept on and there ensues a power supply holding action. Meanwhile, since all the inputs to OR gate 32 are at a low level, a low level input is received at terminal R of counter 30 and a time counting action begins. After the lapse of a prescribed time of 25.6 sec, terminal Q of counter 30 changes to a high level. Then, the level of OR gate 17 also become high. Flip-flop 15 is reset, which resetting turns off transistor 13 through OR gate 14 which further turns off transistor 2. With transistor 2 turned off, the power supply holding action comes to an end. As described above, with dial 132 operated to adjust the index 132a to the position TMR and with the first stroke depressing operation on the shutter release button exceeding 0.1 sec the power supply stays on for 25.6 sec to permit light measurement, computation and display actions to be continuously performed even though the photographer's finger is detached from the shutter release button.

During the above stated timer operation (or during the power supply holding action), when the shutter release button is further depressed to the second stroke of the depressing operation, switch 21 turns on to set flip-flop 16. Transistor 13 is then kept on to keep on the power supply to each circuit respective of the output status flip-flop 15. Further, with switch 21 closed, level of the terminal P of counter 30 becomes high and the level of terminal Q also becomes high. This causes flip-flop 15 to be reset by OR gate 17. When the first stroke depressing operation on the shutter release button continues for longer than 0.1 sec, the terminal R of the counter 30 remains at a low level so long as the switch 20 is closed. Therefore, once switch 21 is closed, terminal Q of counter 30 is kept at a high level. In other words, when the shutter release button is depressed to achieve a second stroke, during the time operation, the timer time disappears. Then, power supply to each circuit is stopped after shutter control (i.e. after switch 22 turns on).

In the case where use of illumination is required together with the timer operation because of excessive view finder darkness the arrangement according to the invention operates in the following manner:

Dial 132 is operated to adjust the index 132a to the Lamp position. Then, brush 133 comes into contact with electrodes $135_1$, $135_2$ and $135_3$. This brings switches 60, 20 and 47 into a closed state. After that, the turning on of transistor 2 lights up lamp 46 to illuminate the display by the pointer of the meter 45 while all other actions are performed in the same manner as described in the foregoing.

In accordance with the invention, as described above, when the first stroke depressing operation is unintentionally performed on the shutter release button and continues for less than 0.1 sec, the electronic timer does not begin to operate so that electric power can effectively be prevented from being wasted. Further, since the power supply holding action which is performed by the timer arrangement is brought to an end by a second stroke operation on the shutter release button, the power supply to each circuit can be cut off immediately after an exposure action, again preventing wasteful power consumption. Further, since the timer circuit is arranged to be actuated when the first stroke operation is performed, the power consumption can be reduced to a greater extent than in the case of the known prior art example in which a timer circuit is arranged to be actuated after completion of the first stroke operation as mentioned in the foregoing. In other words, even when the timer is unintentionally actuated while operation thereof is not required, the invented arrangement to operate the timer at the time of the first stroke operation immediately brings the power supply to an end upon completion of the first stroke operation when the length of time of the first stroke operation is longer than the length of time counted by the time counter. This arrangement according to the invention thus effectively prevents wasteful power supply.

What is claimed is:
1. A camera comprising:
   (a) a release operation member;
   (b) a camera circuit including at least a light measuring circuit;
   (c) a power supply circuit forming a power supply path to the camera circuit;
   (d) a timer circuit arranged to keep the power supply circuit in an operative state for a prescribed time counting period; and
   (e) a control circuit arranged to cause the timer circuit to be operative when said release operation member stays in an operative state for a length of time longer than a prescribed length of time.
2. A camera comprising:
   (a) a release operation member shiftable between a resting state, a first operating state and a second operating state;
   (b) a light measuring and display circuit;
   (c) a power supply circuit forming a power supply path to said light measuring and display circuit, said power supply circuit having electrical switch means connected between a power source and said light measuring and display circuit, said switch means having a control electrode which renders the switch means conductive for a period of time during which a signal is impressed on the electrode;
   (d) a timer circuit for performing a time counting action for a prescribed length of time, said timer circuit being arranged to produce an output for impressing said signal on said electrode during the time counting action;
   (e) a control circuit which detects the operating condition of said release operation member and is arranged to render said timer circuit operative when said release operation member stays in said first operating state for a length of time exceeding a prescribed length of time; and
   (f) exposure control means arranged to be actuated by said second operating state of the release operation member.
3. A camera according to claim 2, wherein said control circuit is provided with a second timer circuit which operates when said release operation member shifts from the resting state to the first operating state and performs a time counting action for a prescribed length of time, said second timer circuit being arranged to produce an output for actuating said first timer circuit after completion of said time counting; and, when the release operation member comes to shift from the first operating state back to the resting state prior to completion of said time counting for the prescribed length of time, said second timer circuit is inhibited from producing said output.
4. A camera according to claim 3, wherein said second timer circuit is arranged to be rendered inoperative by shifting of said release operation member from the first operating state thereof back to the resting state thereof.
5. A camera comprising:
   (a) a release operation member arranged to be shiftable between a resting state, a first operating state and a second operating state;
   (b) a switch arranged to be shiftable from a first state to a second state in response to shifting of said release operation member from the resting state to the first operating state thereof;
   (c) a timer circuit arranged to operate when said switch shifts from the first state to the second state and to perform a time counting action for a prescribed length of time;
   (d) a light measuring and display circuit; and
   (e) a power supply circuit arranged to effect power supply to said light measuring and display circuit over a length of time defined by said timer circuit.
6. A camera comprising:
   (a) a release operation member arranged to be shiftable between a resting state, a first operating state and a second operating state;
   (b) a switch arranged to be in a first switching state when said release operation member is in the resting state and to be in a second switching state when the release operation member shifts from the resting state to the first operating state, said switch being arranged to remain in the second switching state while the release operation member stays in the first operating state;
   (c) a power supply circuit which effects power supply to circuits of the camera when said switch is in the second switching state, said power supply circuit having an electrical switch means which has a control electrode and is arranged to be in a conductive state while said electrode has a signal impressed thereon, said electrical switch means being connected between a power source and the camera circuits;
   (d) timer-mode selection means;
   (e) a timer circuit arranged to operate to perform a time counting action in response to shifting of said switch from the first switching state to the second switching state when the timer mode is selected by said timer-mode selection means,
   said timer circuit being arranged to impress said signal on the electrode of said electrical switch means during said prescribed time counting action, whereby, in the timer mode, the power supply to the camera circuits remains uninterrupted even by shifting of said switch from said second switching state to the first switching state; and (f) exposure control means arranged to be made operative by shifting of the release operation member from the first operating state to the second operating state thereof.

7. A camera having a release operation member shiftable between a resting state, a first operating state and a second operating state; electrical switch means effecting power supply to circuits of the camera; a timer circuit arranged to perform a prescribed time counting action in response to the operation of said release operation member; and a control circuit which impresses a signal on the control electrode of said electrical switch means to keep on the power supply to the camera circuits for a prescribed length of time irrespectively of the operating state of the release operation member during said prescribed time counting action of said timer circuit, said camera comprising:

(a) exposure control means arranged to be rendered operative by shifting of said release operation member from the first operating state to the second operating state thereof; and (b) control means for causing said timer circuit to be inoperative in response to shifting of the release operation member from the first operating state to the second operating state thereof.

* * * * *